US008385635B2

(12) United States Patent
Matsuo et al.

(10) Patent No.: US 8,385,635 B2
(45) Date of Patent: Feb. 26, 2013

(54) IMAGE PROCESSING APPARATUS FOR PERFORMING AM SCREEN PROCESSING AND FM SCREEN PROCESSING, IMAGE PROCESSING METHOD, COMPUTER-READABLE MEDIUM

(75) Inventors: Kouta Matsuo, Kanagawa (JP); Toru Misaizu, Kanagawa (JP); Takeshi Saito, Kanagawa (JP); Shigeru Arai, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1030 days.

(21) Appl. No.: 12/397,133

(22) Filed: Mar. 3, 2009

(65) Prior Publication Data

US 2010/0080454 A1 Apr. 1, 2010

(30) Foreign Application Priority Data

Sep. 26, 2008 (JP) ................................ 2008-248338

(51) Int. Cl.
*G06K 9/00* (2006.01)
(52) U.S. Cl. ......................................... 382/162; 358/536
(58) Field of Classification Search .................. None
See application file for complete search history.

(56) References Cited

U.S. PATENT DOCUMENTS

| 5,563,724 | A | * | 10/1996 | Boll et al. ...................... 358/502 |
| 5,936,749 | A | * | 8/1999 | Ikeda ............................ 358/515 |
| 7,027,191 | B1 | | 4/2006 | Steinhauer |
| 7,466,448 | B2 | * | 12/2008 | Yamamoto et al. ............ 358/1.9 |
| 7,508,549 | B2 | * | 3/2009 | Tai et al. ........................ 358/3.2 |
| 7,839,537 | B2 | * | 11/2010 | Tai et al. ........................ 358/3.2 |
| 2003/0234943 | A1 | * | 12/2003 | Van Bael ....................... 358/1.9 |
| 2005/0219628 | A1 | | 10/2005 | Yasutomi et al. |
| 2005/0226498 | A1 | * | 10/2005 | Lee ................................ 382/162 |
| 2005/0243340 | A1 | * | 11/2005 | Tai et al. ........................ 358/1.9 |
| 2005/0243344 | A1 | * | 11/2005 | Tai et al. ........................ 358/1.9 |
| 2007/0046961 | A1 | * | 3/2007 | Kashibuchi et al. ........... 358/1.9 |
| 2007/0127075 | A1 | * | 6/2007 | Inoue ............................ 358/3.01 |
| 2007/0279454 | A1 | * | 12/2007 | Sato et al. ....................... 347/43 |
| 2009/0141311 | A1 | * | 6/2009 | Tai et al. ...................... 358/3.06 |
| 2012/0133992 | A1 | * | 5/2012 | Hirano ......................... 358/3.06 |

FOREIGN PATENT DOCUMENTS

| JP | 11-146189 A | 5/1999 |
| JP | 2002-506229 A | 2/2002 |
| JP | 2004-058390 A | 2/2004 |
| JP | 2004-135317 A | 4/2004 |
| JP | 2005-192195 A | 7/2005 |
| JP | 2006-050347 A | 2/2006 |
| JP | 2007-60149 A | 3/2007 |
| JP | 2008-006624 A | 1/2008 |

OTHER PUBLICATIONS

Japanese Office Action issued on Sep. 15, 2010 in the corresponding Japanese Patent Application No. 2008-248338.

* cited by examiner

*Primary Examiner* — Chan S Park
*Assistant Examiner* — Sean Motsinger
(74) *Attorney, Agent, or Firm* — Sughrue Mion, PLLC

(57) ABSTRACT

An image processing apparatus includes a screen processing unit that performs, on a color component basis, screen processing for a color signal having basic color components and at least one spot color component. The screen processing unit performs FM screen processing for one of the basic color components of the color signal and performs AM screen processing for the color components, other than the one of the basic color components, of the color signal with four types of screen angles.

6 Claims, 11 Drawing Sheets

Y: FM screen processing

IMAGE PROCESSING APPARATUS FOR PERFORMING AM SCREEN PROCESSING AND FM SCREEN PROCESSING, IMAGE PROCESSING METHOD, COMPUTER-READABLE MEDIUM

CROSS-REFERENCE TO RELATED APPLICATIONS

This application is based on and claims priority under 35 USC 119 from Japanese Patent Application No. 2008-248338 filed on Sep. 26, 2008.

BACKGROUND

1. Technical Field

The invention relates to an image processing apparatus, an image processing method, a computer-readable medium and a computer data signal.

2. Related Art

When an image is output, the density of the image is expressed by changing dot sizes or dot densities according to values of respective pixels. Processing of changing the values of the pixels to the dot sizes or the dot densities is called screen processing. Also, the changing to the dot sizes is referred to as AM screen processing, and the changing to the dot densities is referred to as FM screen processing.

When a color image is output, the screen processing is performed for respective color components. In the AM screen processing, if the screen processing for the respective color components are performed in a fixed direction, when dots of all the color components overlap with each other, there would arise no problem; but when dots of the respective color components don't overlap with each other, apparent color changes, which results in color unevenness. Therefore, dot arrangement directions of the respective color components are shifted. Thereby, portions in which dots of the respective color components don't overlap with each other and portions in which they overlap with each other are mixed, so that the color unevenness is reduced as a whole. In this case, the dot arrangement direction is referred to as a screen angle.

When an image consists of five color components including one spot color, it has been known that: an angle range of from 0° to 90° is equally divided into five, and five screen angles of 18°, 36°, 54°, 72° and 90° are assigned to the respective color components.

Since the FM screen processing has no periodicity unlike the AM screen processing, it is hard that interference fringes occur. However, the FM screen processing has such a defect that granularity is poor and color stability is poor, compared with the AM screen processing. Therefore, a color printer, an electrographic image output apparatus, and the like frequently adopt the AM screen processing.

SUMMARY

According to an aspect of the invention, an image processing apparatus includes a screen processing unit that performs, on a color component basis, screen processing for a color signal having basic color components and at least one spot color component. The screen processing unit performs FM screen processing for one of the basic color components of the color signal and performs AM screen processing for the color components, other than the one of the basic color components, of the color signal with four types of screen angles.

BRIEF DESCRIPTION OF THE DRAWINGS

Exemplary embodiments of the invention will be described in detail based on the following figures, wherein.

DETAILED DESCRIPTION

Figure 1:
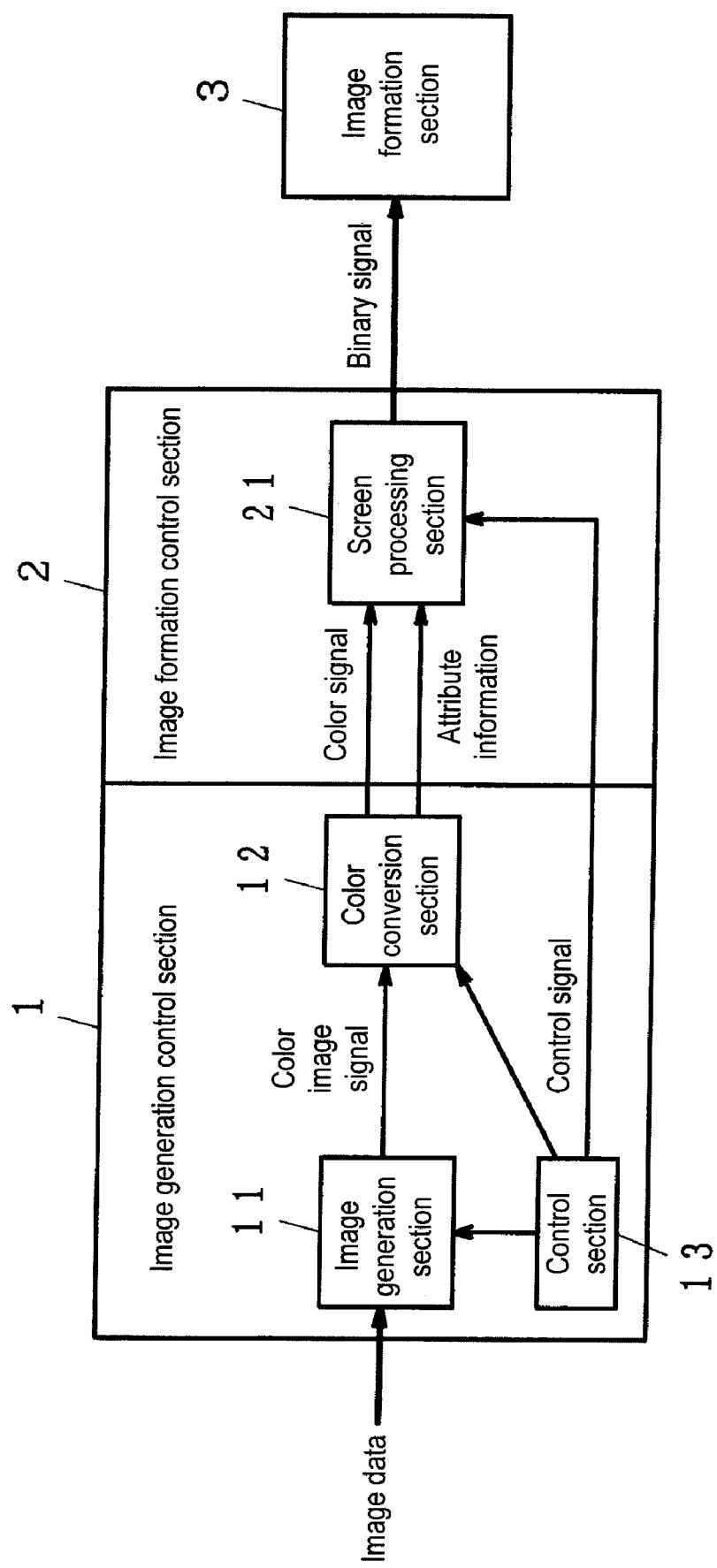
FIG. 1 is a configuration view showing one exemplary embodiment of the invention.

FIG. 1 is a configuration view showing one exemplary embodiment of the invention. In the figure, a reference numeral 1 denotes an image generation control section, 2 denotes an image formation control section, 3 denotes an image formation section, 11 denotes an image generation section, 12 denotes a color conversion section, 13 denotes a control section, and 21 denotes a screen processing section. The example in FIG. 1 shows the configuration for use in the case where image data described in a predetermined description language is received from an outside, an image is generated, and the image is formed by the image formation section 3.

The image generation control section 1 receives image data and performs processing of preparing an image to be passed to the image formation section 3. In this example, the image generation control section 1 includes the image generation section 11, the color conversion section 12 and the control section 13.

The image generation section 11 performs drawing processing in accordance with the received image data, generates a two-dimensional image and passes a color image signal to the color conversion section 12.

The color conversion section 12 converts the color image signal received from the image generation section 11 into a color signal having colors of color materials that are used in the image formation section 3 as color components. Further, the color conversion section 12 may perform various color compensation processing. As described later, the image formation section 3 is configured so that color materials of some spot colors may be used together with color materials of basic colors that are used in general color image formation. The color conversion section 12 performs color conversion for a color signal having the basis color components and the spot color components, and passes the resultant color signal to the image formation control section 2. Some color conversion methods are selectively used to perform the color conversion. The color conversion methods includes, for example, (i) a color conversion method that processes each complementary-color pair of color components (one color component is a complementary color component of the other) so that at least one of the color components of each complementary-color pair is equal to or less than a predetermined value, (ii) a color conversion method that renders any one of the spot color components to have a larger value than a predetermined value, and (iii) a color conversion method that converts into a color signal consisting of the basic color components without the spot colors. It is a matter of course that a color conversion method may be selected from among some color conversion methods including the above color conversion methods and other color conversion methods, to perform the color conversion. A color conversion method to be used may be set in advance, may be set in the image data received by the image generation section 11, or may be selected in accordance with the image generated in the drawing processing by the image generation section 11. Further, a color conversion method to be used may be selected in accordance with priority in image quality that is used in the screen processing section 21 of the image formation control section 2. Which color conversion method the color conversion section 12 uses is output as attribute information together with the color signal, and the attribute information and the color signal are passed to the image formation control section 2.

Further, the color conversion section 12 may be configured so as to receive, in addition to the color image signal subjected to the drawing processing by the image generation section 11, a color image signal read by a image reading section (not shown) and perform the color conversion for the read color image signal. Also, in this case, together with the color signal obtained by the color conversion, the color conversion section 12 outputs an attribute signal including a command signal that specifies the color conversion method.

The control section 13 controls the respective sections of the image generation control section 1, and further sends a control signal indicating as to whether spot colors are used to the color conversion section 12 and the screen processing section 21 of the image formation control section 2. Whether or not the spot colors are used may be specified in the image data received by the image generation section 11, may be set in advance or may be determined based on whether or not the spot color materials are mounted on the image formation part 3.

The image formation control section 2 controls the image formation section 3, and causes the image formation section 3 to form an image in accordance with the color signal and the attribute information, which are passed from the image generation control section 1. In this example, the image formation control section 2 includes the screen processing section 21.

The screen processing section 21 performs, on the color component basis, the color signal having the basic color components and the spot color components in accordance with the attribute information passed from the image generation control section 1 and/or the control signal passed from the control section 13 of the image generation control section 1. When the color signal includes at least one complementary-color pair of color components and the attribute information indicates that at least one of the color components of each of the at least one complementary-color pair is equal to or less than a predetermined value, the screen processing section 21 assigns different screen angles to the basic color components of the color signal, assigns a common screen angle to the color components of each of the at least one complementary-color pair, and performs AM screen processing for the respective color components of the color signal. Also, when the attribute information indicates that any one of the spot color components of the color signal has a larger value than a predetermined value, the screen processing section 21 performs FM screen processing for one of the basic color components of the color signal, assigns a common screen angle to the spot color components, assigns to the basic color components other than the one of the basic color components screen angles that are different from each other and different from the common screen angle, and performs AM screen processing for the spot color components and the basic color components other than the one of the basic color components. The screen processing section 21 may perform the FM screen processing for, for example, the Y component. Also, the dithering method may be used as the AM screen processing, and the error diffusion method may be used as the FM screen processing.

Further, when the color conversion method cannot be specified based on the attribute information or when the color conversion is performed by a color conversion method other than the above color conversion methods, the screen processing section 21 may determine the screen processing method in accordance with a command from the control section 13, the predetermined priority in image quality, an analysis result of the color signal and/or the like. The priorities in image quality, for example, include "moiré avoidance priority" that is to suppress generation of interference fringes, "graininess priority" that is to prioritize an image quality without granularity of an image being lowered, and "automatic" that is to leave determination to an image processing apparatus.

Under control of the image formation control section 2, the image formation section 3 forms an image based on a binary signal of each color component that is subjected to the screen processing by the screen processing section 21. This image formation section 3 has a function of forming an image with color materials of basic colors that are used in generating a general color image, and also a function of forming an image with color materials of spot colors other than basic colors. As the color materials of the basic colors, for example, color materials of C, M, Y; color materials of C, M, Y, K; or color materials of R (red), G (green), B (blue) are used. When CMY or CMYK are used as the basic colors, color materials such as O, G, V and/or a transparent color material are selectively used as the color materials of the spot colors. The basic colors and spot colors are not limited to these examples. In the following description, it is assumed that CMYK are used as the basic colors and that OGV are used as the spot colors.

Next, an example of an operation of the exemplary embodiment of the invention will be described. When image data described in the predetermined description language is sent from, for example, a computer through a communication unit or directly, the image generation control section 1 receives this image data. Then, the control section 13 controls the respective sections and starts an image formation operation. At this time, the control section 13 determines, based on predetermined information and an image formation command sent together with the image data, as to whether an image is formed only with the basic colors or with the basic colors and the spot colors. Thereafter, the control section 13 transmits the determination result as a control signal to the respective sections including the color conversion section 12 and the screen processing section 21.

Upon reception of the image data, in the image generation control section 1, the image generation section 11 performs the drawing processing in accordance with the image data, and transmits the drawn image to the color conversion section 12 as a color image signal.

The color conversion section 12 performs, for the color image signal received from the image generation section 11, various color processing such as color conversion processing and tone correction processing. In particular, the color conversion section 12 selects, in accordance with the control signal from the control section 13, as to whether the color conversion processing is to convert into a color signal consisting of the basic colors or into a color signal including the basic colors and the spot colors. When the spot colors are used together, a color conversion method is also selected. In this example, when the spot colors are used together, a color conversion method is selected from (i) the color conversion method, which processes each complementary-color pair of color components (one color component is a complementary color component of the other) so that at least one of the color components of each complementary-color pair is equal to or less than the predetermined value and (ii) the color conversion method, which renders any one of the spot color components to have a larger value than the predetermined value. The selection from these color conversion methods may be determined in advance or may be performed in accordance with predetermined priorities. When the priorities are set up, a higher priority is given to the color conversion method, which processes each complementary-color pair of color components (one color component is a complementary color component of the other) so that at least one of the color components of each complementary-color pair is equal to or less than a predetermined value. If this color conversion method cannot be applied, the color conversion method, which renders any one of the spot color components to have a larger value than the predetermined value, is selected. The color conversion section 12 outputs the attribute information including specification information indicating the selected color conversion method, together with the color signal obtained by the color conversion.

Also, the attribute information may include number-of-line information indicating the number of screen lines. The number-of-line information may be set by known various methods. For example, the number-of-line information may be set according to drawing graphics formed by the drawing processing in the image generation section 11, such as drawn characters, drawn graphics, or a stuck photograph, or may be set by analyzing the color image signal.

Figure 2A:
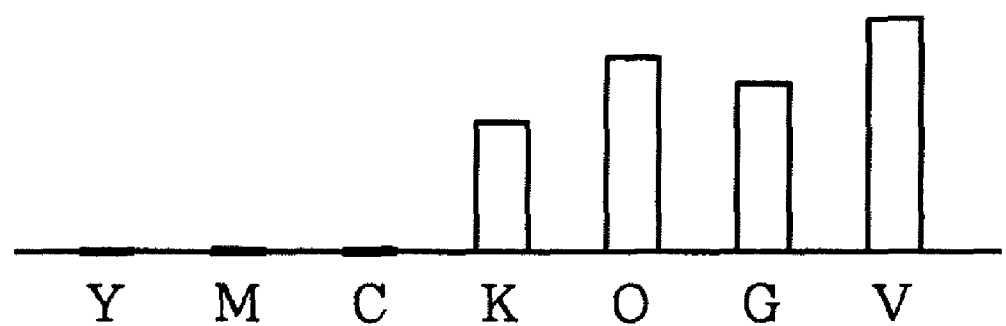
FIGS. 2A and 2B are explanatory views showing a first example of a color conversion method.
Figure 2B:
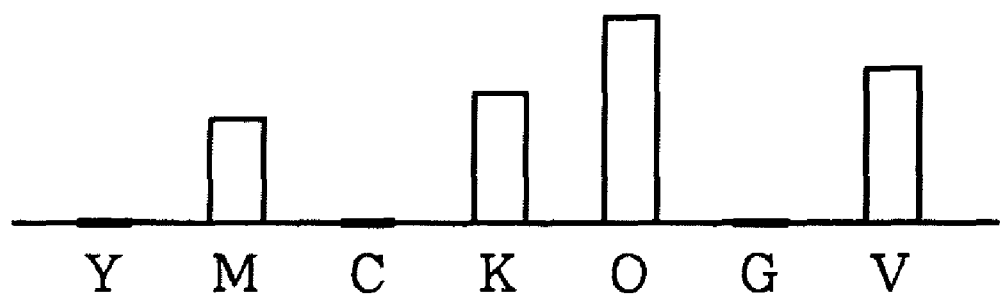
Figure 3A:
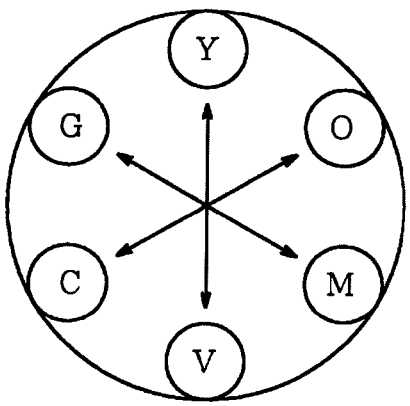
FIGS. 3A to 3D are diagrams for explaining an example of a complementary color relation.

FIGS. 2A and 2B are explanatory views showing a first example of the color conversion method, and FIGS. 3A to 3D are diagrams for explaining examples of complementary color relations. Herein, description will be given on the color conversion method, which processes each complementary-color pair of color components (one color component is a complementary color component of the other) so that at least one of the color components of each complementary-color pair is equal to or less than the predetermined value. The complementary colors refer to a pair of colors that are located on the color circle to be opposite to each other. For example, when C, M, Y, K are used as the basic colors and O, G and V are used as the spot colors, Y and V; M and G and C and O have a complementary color relation therebetween as shown in FIG. 3A, and constitute complementary-color pairs. The color conversion is performed so that at least one of the color components of each complementary-color pair becomes equal to or less than the predetermined value. For example, in the example of FIG. 2A, Y of the Y-V pair is equal to 0, M of the M-G pair is equal to 0, and C of the C-O pair is equal to 0. Also, in the example of FIG. 2B, Y of the Y-V pair is equal to 0, G of the M-G pair is equal to 0, and C of the C-O pair is equal to 0. In this manner, at least one of the color components of each complementary-color pair is equal to or less than the predetermined value.

Figure 3B:
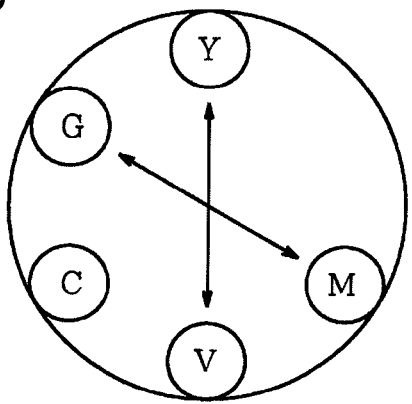
Figure 3C:
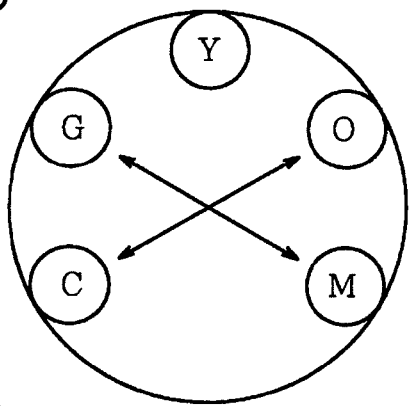
Figure 3D:
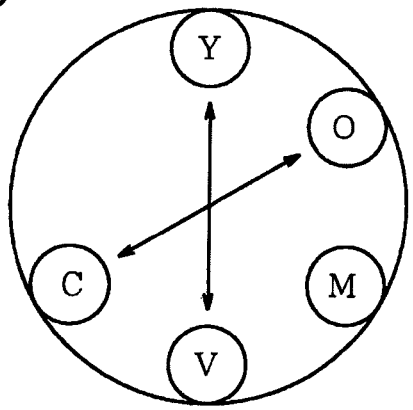

Further, when C, M, Y, K are used as the basic colors and G and V are used as the spot colors, Y and V, and M and G constitute complementary-color pairs as shown in FIG. 3B, and there is no complementary color component of C. When O and G are used as the spot colors, M and G, and C and O constitute complementary-color pairs as shown in FIG. 3C, and there is no complementary color component of Y. When O and V are used as the spot colors, Y and V, and C and O constitute complementary-color pairs as shown in FIG. 3D, and there is no complementary color component of M.

Figure 4A:
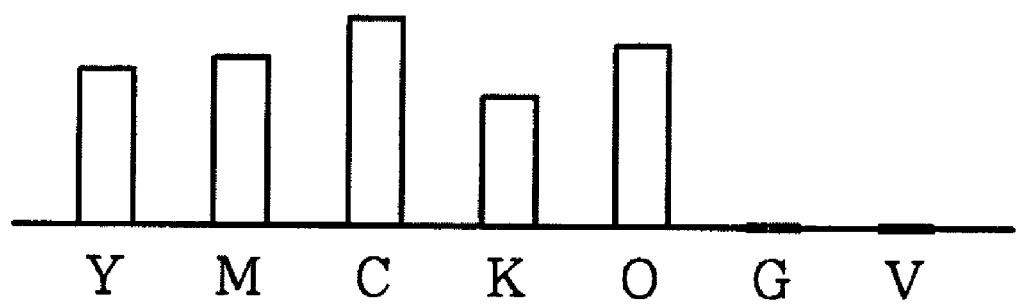
FIGS. 4A and 4B are explanatory views showing a second example of the color conversion method.
Figure 4B:
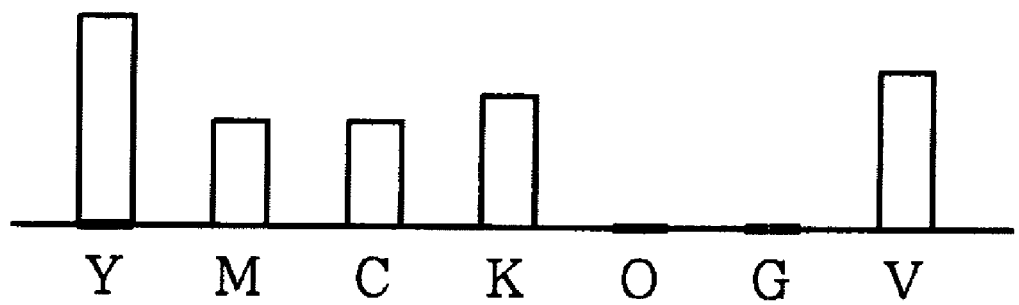

FIGS. 4A and 4B are explanatory views showing a second example of the color conversion method. Herein, the description will be given on the color conversion method, which renders any one of the spot color components to have a larger value than the predetermined value. For example, when C, M, Y, and K are used as the basic colors and O, G and V are used as the spot colors, the color conversion is performed so that any color component in the basic colors may be used but only any one of O, G and V in the spot colors is used. For example, in an example of FIG. 4A, spot colors other than O, that is, G and V are equal to 0. Further, in an example of FIG. 4B, spot colors other than V, that is, O and G are equal to 0. Thus, any one of the spot colors has a larger value than the predetermined value.

When performing the color conversion into a color signal having a spot color(s), the color conversion section 12 selectively uses (i) the color conversion method, which processes each complementary-color pair of color components so that at least one of the color components of each complementary-color pair is equal to or less than the predetermined value as shown in FIGS. 2A and 2B or (ii) the color conversion method, which renders any one of the spot color components to have a larger value than the predetermined value as shown in FIGS. 4A and 4B. The color conversion section 12 outputs, together with the color signals obtained by the color conversion, the attribute information including the specification information indicating which color conversion method is used.

Figure 5:
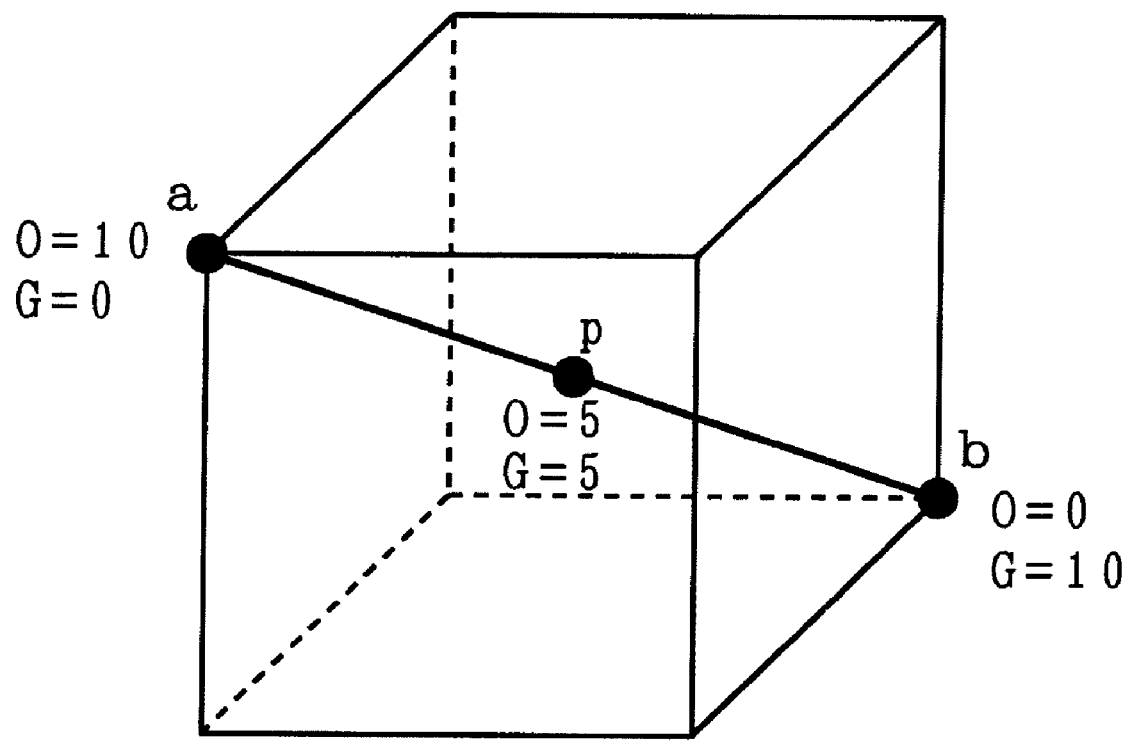
FIG. 5 is a diagram for explaining an example of a predetermined value in each color conversion method.

FIG. 5 is a diagram for explaining an example of the predetermined value in each color conversion method. In the color conversion method, which is explained with reference to FIGS. 2A and 2B, the color conversion processes each complementary-color pair of color components so that at least one of the color components of each complementary-color pair is equal to or less than the predetermined value. Also, in the color conversion method, which is explained with reference to FIGS. 4A and 4B, the color conversion renders any one of the spot color components to have a larger value than the predetermined value. In these color conversion methods, the predetermined values are used as threshold values. Although it is desirable that these predetermined values are essentially set to 0, those values may be set so as to permit errors that are produced when interpolation is used in the color conversion processing or may be set to values other than 0 so long as generated interference fringes are inconspicuous.

The errors caused by the interpolation in the color conversion processing are shown in FIG. 5. It is assumed that a color signal to be obtained is a converted color of a color p, that a color a has O=10 and G=0 and a color b has O=0 and G=10, and that interpolation is performed using the colors a and b. In this case, the color p becomes O=5 and G=5. When the color conversion section 12 performs the color conversion by the color conversion method shown in FIG. 4 in which any one of the spot color components to have a larger value than the predetermined value, the color-p has values other than zero in both of O and G. However, a color component(s) other than the one of the spot color components are allowed to have values other than o so long as they are equal to or less than a predetermined value and are about interpolation errors.

Also, in the color conversion shown in FIGS. 2A and 2B, which processes each complementary-color pair of color components so that at least one of the color components of each complementary-color pair is equal to or less than the predetermined value, when C that is the complementary color of O has a larger value than the predetermined value, even if O has a value due to the interpolation error as shown in FIG. 5, O is allowed to has a value other than 0 so long as its value is within a range of the interpolation error.

The color signal and the attribute information output from the color conversion section 12 are input to the screen processing section 21 of the image formation control section 2. The screen processing section 21 determines the screen processing in accordance with the attribute information passed from the image generation control section 1 and the control signal sent from the control section 13 of the image formation control section 1. Then, the screen processing section 21 performs the determined screen processing for the color signal.

Figure 6:
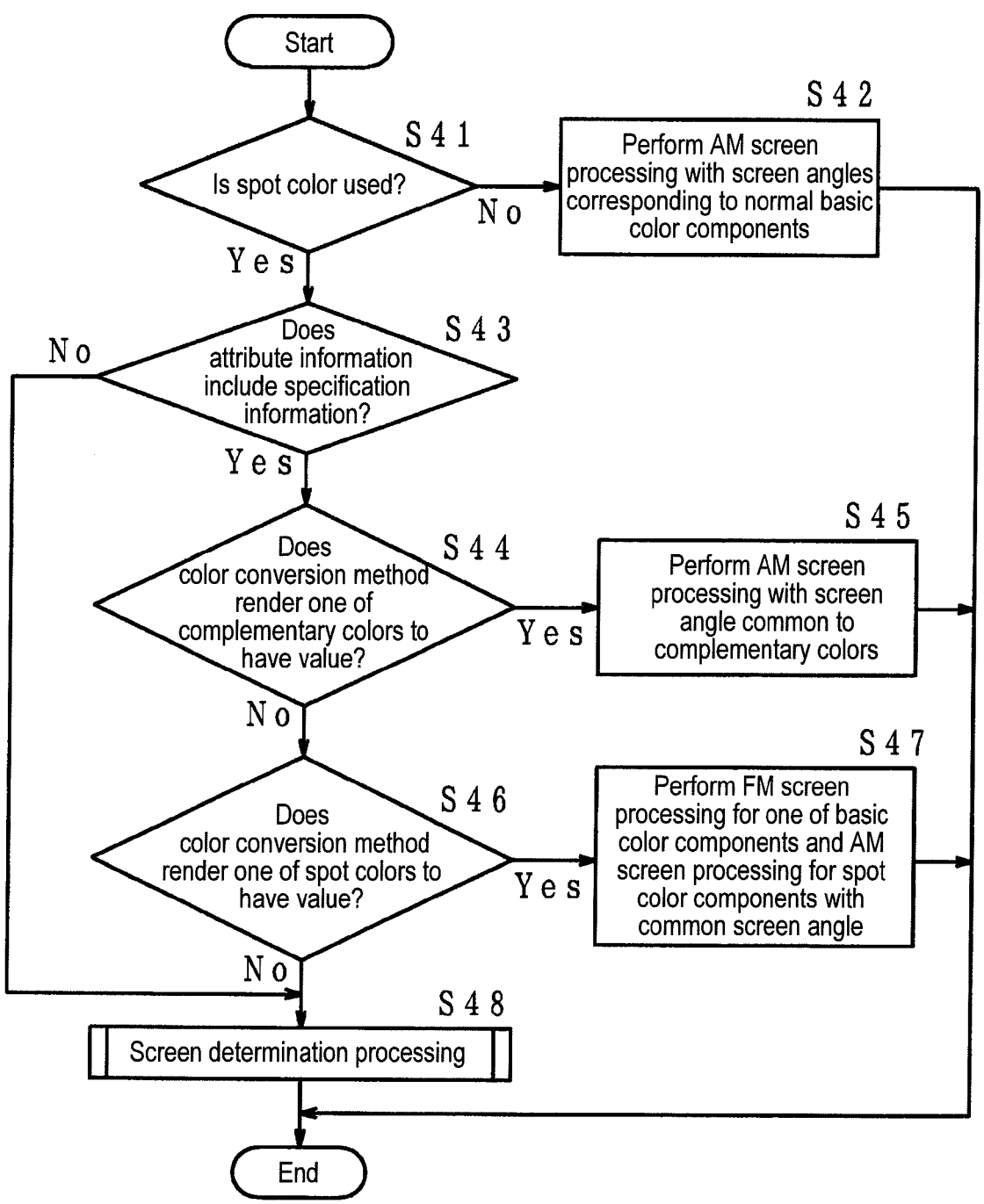
FIG. 6 is a flowchart showing an example of an operation of a screen processing section.
Figure 7A:
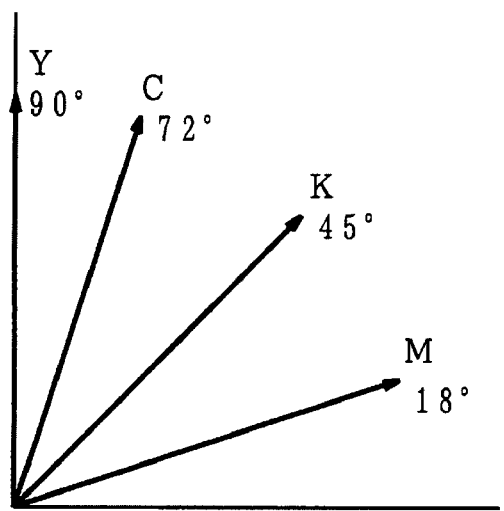
FIGS. 7A to 7C are diagrams for explaining examples of screen angles.
Figure 7B:
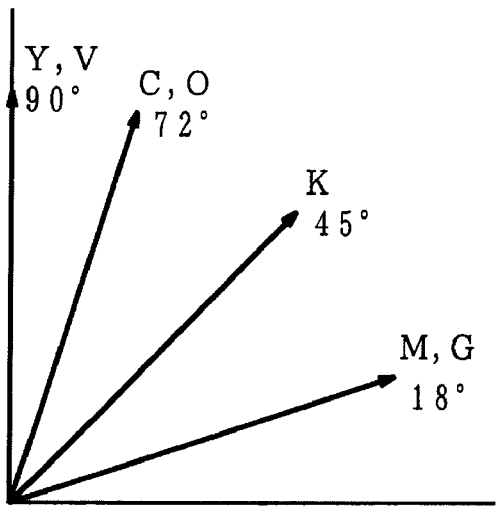
Figure 7C:
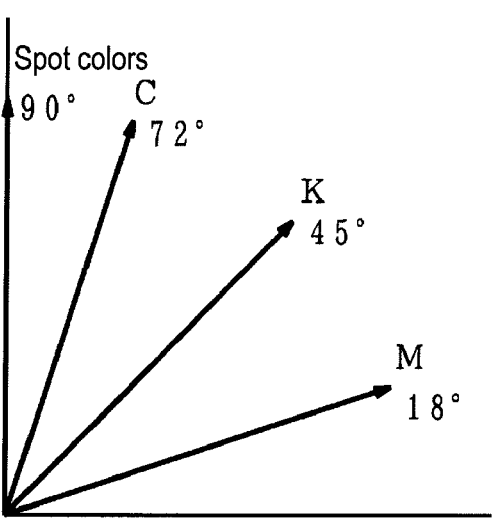

FIG. 6 is a flowchart showing an example of the operation of the screen processing section, and FIGS. 7A to 7C are diagrams for explaining examples of screen angles. In FIG. 7, CMYK are shown as the basic colors, and OGV are shown as the spot colors.

At first, in S41, the screen processing section 21 checks the control signal sent from the control section 13 of the image generation control section 1. If the control signal indicates that spot colors are not used, the screen processing section 21 is to perform screen processing for normal basic colors. That is, the screen processing section 21 performs the screen processing for the basic colors in a S42. In this case, as shown in FIG. 7A, screen angles of the respective color components are set so that a difference between the screen angles of the respective color components becomes large.

If the control signal indicates that spot colors are used, the screen processing section 21 determines, in S43, as to whether or not the specification information indicating the color conversion method is included in the attribute information passed from the color conversion section 12 of the image formation control section 1. If the specification information is not included in the attribute information, the screen processing section 21 further performs screen determination processing (which will be described later) in S48.

If the specification information is included in the attribute information, the screen processing section 21 determines, with reference to the specification information, as to whether or not the specification information indicates the color conversion method, which has processed each complementary-color pair of color components so that at least one of the color components of each complementary-color pair is equal to or less than the predetermined value. If this color conversion method is indicated, the screen processing section 21 assigns different screen angles to the basic colors, assigns a common screen angle to a complementary-color pair (a pair of a color component and its complementary color component), and performs AM screen processing for the respective color components in S45.

The screen angles in this case are shown in FIG. 7B. Since C and O, M and G, and Y and V constitute complementary color relations, different screen angles are assigned to CMYK as shown in FIG. 7A, a common screen angle is assigned to C and O, another common screen angle is assigned to M and G, and a still another common screen angle is assigned to Y and V. The AM screen processing is performed with such screen angles. Regarding the color components having the complementary color relation therebetween, one of them is equal to or less than the predetermined value. Therefore, even if the common screen angles are used, interference fringes don't become conspicuous. Further, the screen angles for the basic colors in this case are the same as the screen angles that are used when the spot colors are not used.

In S46, the screen processing section 21 determines as to whether or not the specification information indicates that any one of the spot color components has a larger value than the predetermined value. If this color conversion method is used, in S47, the screen processing section 21 performs the FM screen processing for one of the basic color components, assigns a common screen angle to the spot color components, assigns to the basic color components other than the one of the basic color components screen angles that are different from each other and different the common screen angle and performs the AM screen processing.

The screen angles in this case are shown in FIG. 7C. In this example, the FM screen processing such as the error diffusion method is performed for Y of the basic color components. The screen angle, which is assigned to Y when the spot colors are not used, is assigned to the spot colors. The FM screen processing is performed for the spot colors. Further, the AM screen processing is performed for CMK using the screen angles, which are used when the spot colors are not used, as they are. Further, Y becomes lower in graininess and color stability due to the FM screen processing as compared with the case where the AM screen processing is performed for Y. However, since Y is color that is originally difficult to be conspicuous, image quality is not affected as compared with the case where the FM screen processing is performed for colors other than the Y-color.

Also, if the color conversion method is different from any of the color conversion methods determined in S44 and S46, screen processing corresponding to another color conversion method may be performed. In this exemplary embodiment, in S48, screen determination processing described later is further performed.

The screen processing section 21 sets the screen angle for each color component as described above to perform the screen processing. At this time, if number-of-line information indicating the number of screen lines is included in the attribute information passed from the color conversion section 12 of the image generation control section 1, the screen processing section 21 performs the screen processing with the number of screen lines indicated by the number-of-line information. If information other than the number-of-line information, for example, information concerning drawing graphics is set, the number of screen lines according to each drawing graphic may be set to perform screen processing.

By performing the screen processing in the screen processing section 21, the color signal is converted into binary signals for the respective color components. The binary signals for the respective color components are input to the image formation section 3, and a color image is formed.

Figure 8:
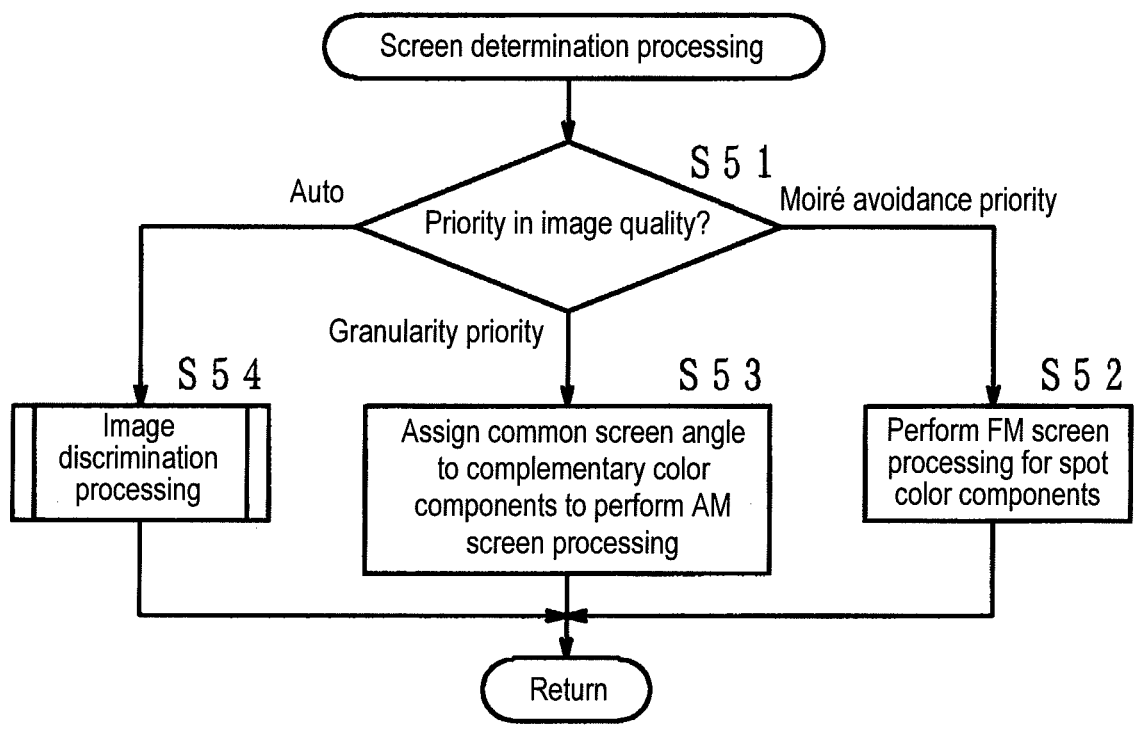
FIG. 8 is a flowchart showing an example of screen determination processing.
Figure 9:
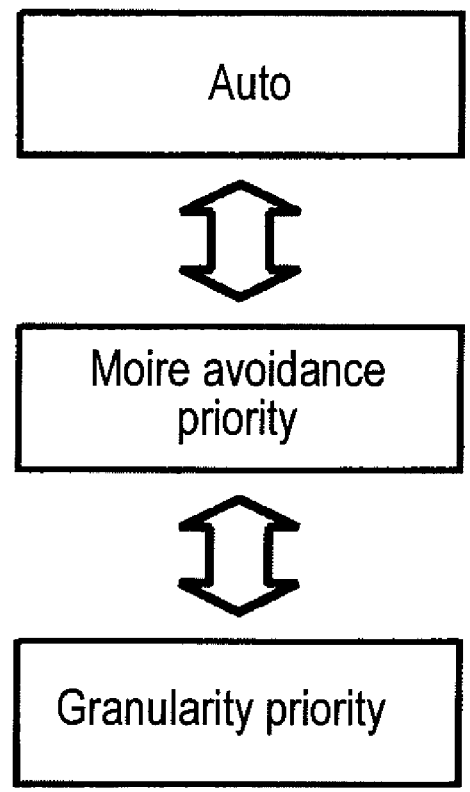
FIG. 9 is a view for explaining setting of priority in image quality.

FIG. 8 is a flowchart showing an example of the screen determination processing. FIG. 9 is a view for explaining setting of a priority in image quality. If the specification information is not included in the attribute information in S43 of FIG. 6 or if the specification information indicates a color conversion method other than the color conversion methods determined in S44 and S46, the screen determination processing shown in FIG. 8 is performed in this exemplary embodiment. For example, when the functions of the image generation control section 1 are executed at the outside to input the color signal and the attribute information to the image formation control section 2, since the color conversion processing is not performed by the color conversion section 12, the color conversion method is not specified. In order to deal with such that case, the screen determination processing shown in FIG. 8 is performed.

If the color conversion method is not known as described above or if a color conversion method other than the above color conversion methods is used, there is possibility that all of the color components of the basic colors and the spot colors are utilized. Therefore, a priority in image quality is set in advance, and screen processing is performed in accordance with the settings of the priority in image quality.

In the screen determination processing of this example, at first, in S51, the priority in image quality, which is set in advance, is checked, and processing is performed in accordance with the priority in image quality. The priority in image quality is selected and set in advance by a user from selection items of "moiré avoidance priority", "graininess priority", and "auto". Other selection items may be prepared.

If "moiré avoidance priority" is set as the priority in image quality in S51, the following processing is performed in S52. That is, the screen angles, which are used when spot colors are not used, are assigned to the basic color components, and the AM screen processing is performed for the basic color components. Also, the FM screen processing is performed for all of the spot color components.

If "granularity priority" is set as the priority in image quality in S51, the following processing is performed in S53. That is, the screen angles, which are used when spot colors are not used, are assigned to the basic color components, and a common screen angle is assigned to each spot color component and a basic color component that is complementary color component of each spot color component, and the AM screen processing is performed for all the color components. Alternatively, intermediate screen angles with respect to the screen angles assigned to the basic color components may be assigned to the spot color components to perform the AM screen processing.

If "auto" is set as the priority in image quality, a type of the image is discriminated based on the color signal in S54, and screen processing corresponding the type is performed.

Figure 10:
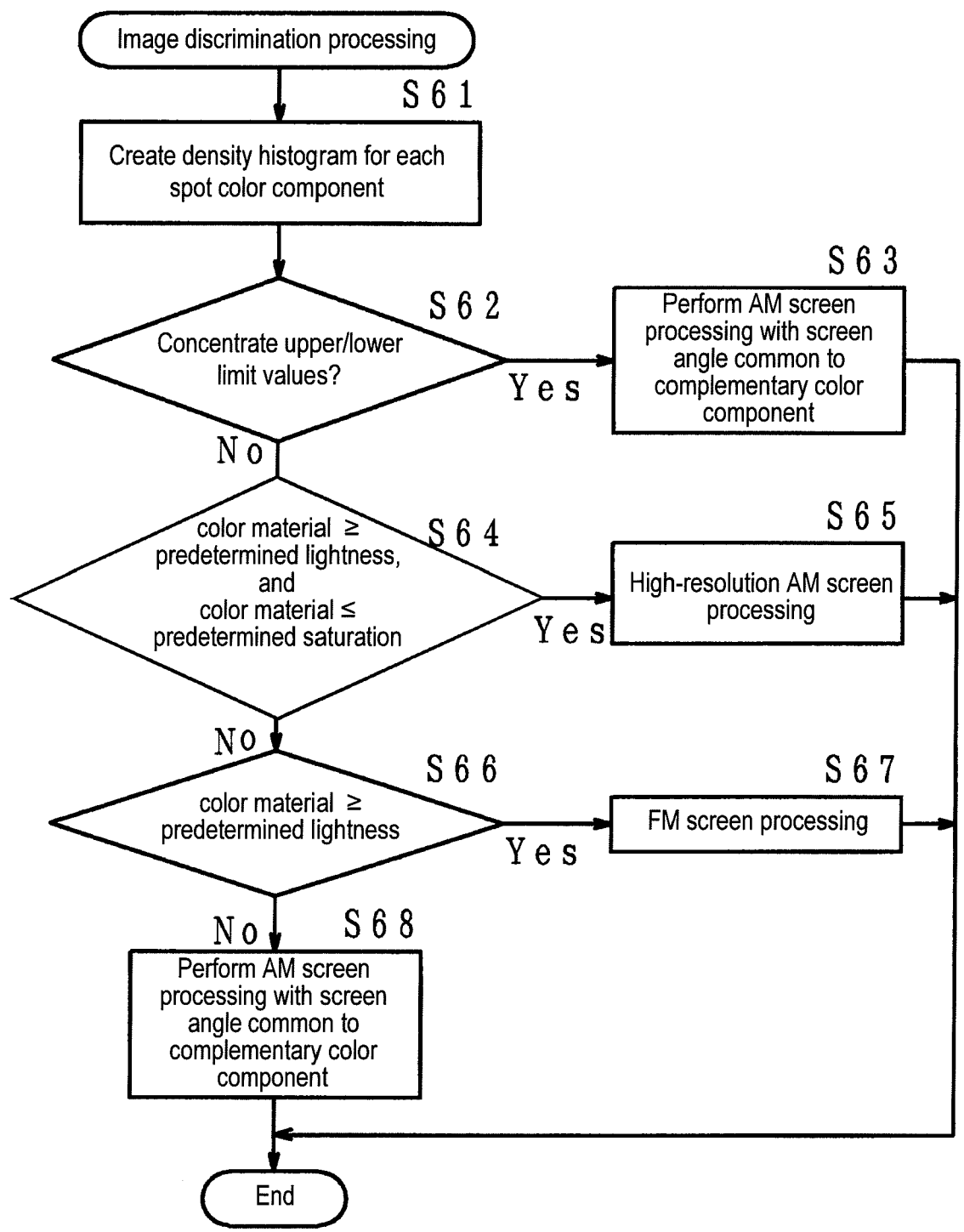
FIG. 10 is a flowchart showing an example of image discrimination processing.

FIG. 10 is a flowchart showing an example of image discrimination processing. As an example of the image discrimination processing performed in S54 in FIG. 8, FIG. 10 shows processing for one of the spot color components. Namely, the processing shown in FIG. 10 is performed each of the spot color components. In this case, the screen angles, which are used when spot colors are not used, are assigned to the basic color components to perform the AM screen processing.

In S61, a density histogram is created for one of the spot color components. Decisions will be made in S62, S64 and S66 based on this density histogram. In S62, it is determined as to whether or not the density histogram concentrates on an upper limit value and a lower limit value. If the density histogram concentrates on the upper limit value and the lower limit value, it is founded that intermediate colors using the one of the spot color component are not used. In this case, since an area in which the one of the spot color components is used is filled with the one of the spot color components, there is no change even if any screen processing is performed for the one of the spot color components. In this example, in S63, a screen angle common to one of the basic color components that has a complementary color relation with the one of the spot color components is assigned to the one of the spot color components, and the AM screen processing is performed.

If the density histogram does not meet the condition of S62, it is determined in a step S64 as to whether or not lightness of the one of the spot color components itself used in the image formation section 3 is equal to or larger than a predetermined value and whether or not saturation thereof is equal to or smaller than a predetermined value. If the condition of S64 is satisfied, for example, if a transparent and colorless material is used as the one of the spot color components, the AM screen processing using higher number of lines is performed for the one of the spot color components in S65a, than the number of lines used for the other spot color components.

If the density histogram does not meet the condition of S64, it is determined in step S66 as to whether or not lightness of the one of the spot color components used in the image formation section 3 is equal to or larger than a predetermined value. The FM screen processing such as the error distribution method is performed in S67 for the spot color components, which are larger than the predetermined lightness.

If any of the conditions of S62, S64 and S66 is not satisfied, a screen angle common to a basic color component that is a complementary color component of the one of the spot color component is assigned to the one of the spot color components or a screen angle that is different from the screen angles for the basic color components is assigned to the one of the spot color components, and the AM screen processing is performed.

The above processing is performed for each spot color component.

Figure 11:
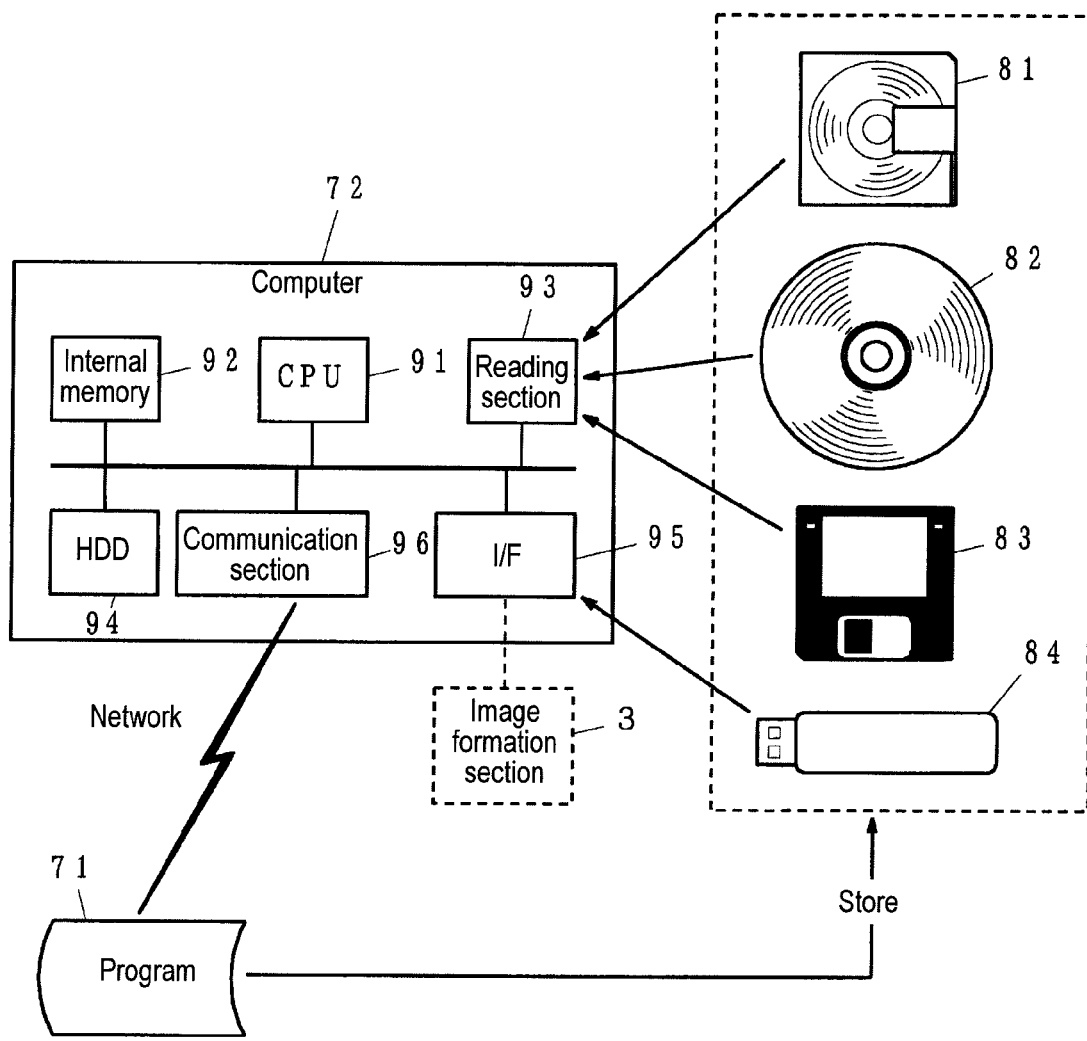
FIG. 11 is a diagram showing an example of a computer program by which functions described in the exemplary embodiments of the invention are implemented, a recording medium that stores the computer program, and a computer.

FIG. 11 is a diagram showing an example of a computer program by which the functions described in the exemplary embodiment of the invention are implemented, a recording medium that stores the computer program, and a computer. In the figure, a numeral 71 denotes a program, 72 denotes a computer, 81 denotes a magneto-optical disk, 82 denotes an optical disk, 83 denotes a magnetic disk, 84 denotes a memory, 91 denotes CPU, 92 denotes an internal memory, 93 denotes a reading section, 94 denotes a hard disk, 95 denotes an interface, and 96 denotes a communication section.

A part or all of the function of each part described in the exemplary embodiment of the invention may be implemented by a program 71 that can be executed by the computer. In that case, its program 71 and data which its program uses may be stored in a computer readable recording medium. The recording medium is what causes, for the recording part 93 provided in hardware resources of the computer, a change state of energy such as magnetic, optical, or electric energy according to description contents of the program, and transmits the description contents of the program in a signal form corresponding to its change state to the reading section 93. As the recording mediums, there are, for example, the magneto-optical disk 81, the optical disk 82 (including CD, DVD, and the like), the magnetic disk 83, the memory 84 (including an IC card, a memory card, and the like), and the like. Naturally, these recording mediums are not limited to portable mediums.

The program 71 is stored in these recording mediums, and these recording mediums are attached to the reading section 93 or the interface 95 of the computer 72, whereby the program 71 is read out from the computer, stored in the internal memory 92 or the hard disk 94, and executed by the CPU 91. Hereby, a part or all of the function of each part described in the exemplary embodiment of the invention is implemented. Alternatively, a part or all of the function may be implemented by transferring the program 71 to the computer 72 through a communication means, receiving the program 71 by the communication section 96 in the computer 72 to record the program 71 in the internal memory 92 or the hard disk 94, and executing the program 71 by the CPU 91.

In addition, to the computer 72, various devices may be connected through the interface 95. For example, the image formation section 3 may be connected through the interface 95 to the computer 72. Further, a display device for displaying information, an input device from which a user inputs information, and the like may also be connected to the computer 72 so that the user can set the priority in image quality and the like. Further, an output device may be connected to the computer 72 to perform output according to an output color signal or a second color signal. Further, an image reading device may be connected to the computer 72 so that the image read out by the image reading device is subjected to the color processing and the screen processing and an image is output in the image formation section. As an application example, the invention may be constituted as a printer, a copying machine, and a facsimile device.

What is claimed is:

1. An image processing apparatus comprising:
    a screen processing unit that performs, on a color component basis, screen processing for a color signal having basic color components and at least one spot color component, wherein
    the screen processing unit receives the color signal and attribute information indicating a color conversion method that was used when the color signal was generated,
    when the color signal includes at least one complementary-color pair of color components and the attribute information indicates that at least one of the color components of each of the at least one complementary-color pair is equal to or less than a predetermined value, the screen processing unit assigns different screen angles to the basic color components of the color signal, assigns a common screen angle to the color components of each of the at least one complementary-color pair, and performs AM screen processing for the respective color components of the color signal, and
    when the attribute information indicates that any one of the at least one spot color component of the color signal has a larger value than the predetermined value, the screen processing unit performs FM screen processing for one of the basic color components of the color signal, assigns a common screen angle to the at least one spot color component, assigns to the basic color components other than the one of the basic color components screen angles that are different from each other and different from the common screen angle, and performs AM screen processing for the at least one spot color component and the basic color components other than the one of the basic color components,
    wherein the screen processing unit performs the screen processing using a processor.

2. The image processing apparatus according to claim 1, further comprising:
    a color conversion unit that converts a color image signal into the color signal having the basic color components and the at least one spot color component, wherein
    the color conversion unit sends a color conversion method, that was used when the color image signal is converted into the color signal, as the attribute information to the screen processing unit together with the color signal.

3. The image processing apparatus according to claim 1, wherein when the attribute information indicates neither that that at least one of the color components of each of the at least one complementary-color pair is equal to or less than the predetermined value nor that any one of the at least one spot color component of the color signal has a larger value than the predetermined value, the screen processing unit performs the screen processing in accordance with an analysis result of the color signal.

4. The image processing apparatus according to claim 1, wherein the screen processing unit performs the screen processing for a spot color having a larger value in lightness than a predetermined value and having a smaller value in saturation than a predetermined value, using higher number of lines than a number of lines used for in the screen processing for the other spot color.

5. The image processing apparatus according to claim 1, wherein when the attribute information indicates neither that that at least one of the color components of each of the at least one complementary-color pair is equal to or less than the predetermined value nor that any one of the at least one spot color component of the color signal has a larger value than the predetermined value, the screen processing unit performs the screen processing in accordance of predetermined priority in image quality.

6. A non-transitory computer-readable medium storing a program that causes a computer to execute image processing, the image processing comprising:
    performing, on a color component basis, screen processing for a color signal having basic color components and at least one spot color component,
    receiving the color signal and attribute information indicating a color conversion method that was used when the color signal was generated, wherein
    FM screen processing is performed for one of the basic color components of the color signal when the attribute information indicates that any one of the at least one spot color component of the color signal have a larger value than a predetermined value,
    assigning a common screen angle to the at least one spot color component,
    assigning to the basic color components other than the one of the basic color components screen angles that are different from each other and different from the common screen angle,
    AM screen processing for the at least one spot color component and the basic color components other than the one of the basic color components,
    assigning different screen angles to the basic color components of the color signal when the color signal includes at least one complementary-color pair of color components and the attribute information indicates that at least one of the color components of each of the at least one complementary-color pair is equal to or less than the predetermined value,
    assigning a common screen angle to the color components of each of the at least one complementary-color pair, and
    AM screen processing is performed for the color components, other than the one of the basic color components, of the color signal with four types of screen angles.

* * * * *